US011883936B2

(12) United States Patent
Trevethan

(10) Patent No.: US 11,883,936 B2
(45) Date of Patent: Jan. 30, 2024

(54) OSCILLATING TOOL ADAPTER

(71) Applicant: Paul Trevethan, Aurora, CO (US)

(72) Inventor: Paul Trevethan, Aurora, CO (US)

( * ) Notice: Subject to any disclaimer, the term of this patent is extended or adjusted under 35 U.S.C. 154(b) by 122 days.

(21) Appl. No.: 17/446,086

(22) Filed: Aug. 26, 2021

(65) Prior Publication Data

US 2023/0060612 A1 Mar. 2, 2023

(51) Int. Cl.
*B25B 28/00* (2006.01)

(52) U.S. Cl.
CPC .................................... *B25B 28/00* (2013.01)

(58) Field of Classification Search
CPC ................................ B25B 28/00; B25B 27/00
See application file for complete search history.

(56) References Cited

U.S. PATENT DOCUMENTS

| | | | | |
|---|---|---|---|---|
| 87,531 | A * | 3/1869 | Wilcox | B25B 17/00 81/57.3 |
| 5,441,450 | A | 8/1995 | Fein et al. | |
| 6,550,357 | B1 * | 4/2003 | Freeman | B25B 13/00 81/177.2 |
| 7,052,383 | B2 | 5/2006 | Sieber | |
| 8,065,936 | B2 * | 11/2011 | Tutino | B25B 17/02 81/57 |
| 8,182,316 | B2 | 5/2012 | Peisert | |
| 8,387,717 | B2 | 3/2013 | Kildevaeld | |
| 8,403,341 | B2 | 3/2013 | Zaiser et al. | |
| 9,073,195 | B2 | 7/2015 | Kaye, Jr. et al. | |
| 9,242,361 | B2 | 1/2016 | Kaye, Jr. et al. | |
| 9,248,562 | B2 | 2/2016 | Bernardi et al. | |
| 9,833,872 | B2 | 12/2017 | Rubens | |
| 9,845,840 | B2 * | 12/2017 | Holloway | F16H 1/06 |
| 10,040,186 | B2 | 8/2018 | Kaye, Jr. et al. | |
| 10,245,716 | B2 | 4/2019 | Kaye, Jr. et al. | |
| 10,265,778 | B2 | 4/2019 | Kaye, Jr. et al. | |
| 10,702,927 | B2 | 7/2020 | Kaye, Jr. et al. | |
| 11,090,783 | B2 * | 8/2021 | Angello | F16H 57/02 |
| 2004/0132392 | A1 | 7/2004 | Bohler | |
| 2008/0196554 | A1 * | 8/2008 | Tutino | B25B 23/0035 81/57.3 |
| 2008/0240884 | A1 * | 10/2008 | Dahners | B25B 13/485 411/190 |
| 2013/0193655 | A1 | 8/2013 | Kaye, Jr. et al. | |
| 2017/0210000 | A1 * | 7/2017 | Lee | B25G 1/063 |
| 2019/0176315 | A1 | 6/2019 | Kaye, Jr. et al. | |
| 2023/0060612 | A1 * | 3/2023 | Trevethan | B25B 28/00 |

* cited by examiner

*Primary Examiner* — Lee D Wilson
(74) *Attorney, Agent, or Firm* — John A. Arsenault; Galen Peterson

(57) ABSTRACT

An adapter assembly is provided for converting a first oscillating motion from an oscillating tool to a second oscillating motion at a wheel that is useful for applying polymers and other films to doors, windows, and other surfaces or for applying rubber gaskets around a window during installation of the window. The adapter assembly is provided with an adapter that tapers in the anterior direction when attached to an oscillating tool. An axle is provided at the distal end of the adapter and attaches to a concentrically aligned bearing within the wheel.

11 Claims, 3 Drawing Sheets

OSCILLATING TOOL ADAPTER

STATEMENT REGARDING FEDERALLY SPONSORED RESEARCH AND DEVELOPMENT

Not Applicable.

FIELD OF INVENTION

Embodiments of the present invention relate to the field of oscillating tool adapters and relate more specifically to an apparatus and method for installing windows and applying polymeric materials to surfaces.

BACKGROUND OF DISCLOSURE

Adhesive vinyl and other polymers are frequently applied to windows and other surfaces for advertising or for displaying various types of information. Numerous techniques for applying adhesive polymers to glass have been known. Rollers and scraping tools are inexpensive devices used by many in the glazing industry; however, effectively removing trapped air pockets between the polymer sheet and the target surface with these devices is quite difficult, especially with larger or thicker polymers sheets.

Various power tools for applying sheets onto surfaces have also been attempted. These power tools often cause discomfort to the user after prolonged use in addition to irreversible damage to the sheet or to the target surface. Furthermore, the process of installing the windows themselves generally requires the application of a polymeric material, or rubber gasket, about the edges of the window being installed. Difficulties arise from attempting to guide a typical installation tool along the edges of the window that contact the frame surrounding the window, and often the result is a non-uniform installation of the rubber gasket or damage to the window.

Thus, there is a need for a device that can effectively apply sheets onto target surfaces, remove air pockets trapped between the sheet and surface, and reduce carpal tunnel and other discomfort or injuries to the hands of the user. There is also a need for a device that can adequately apply rubber gasket to the surrounding edges during window installation.

SUMMARY OF THE DISCLOSURE

The present invention provides an oscillating tool adapter system and method for applying an adhesive sheet to a target surface or for applying a rubber gasket to the area surrounding a window being installed. In a preferred embodiment, the tool adapter system comprises an adapter assembly securable onto an oscillating tool and directed towards the anterior direction of the tool, the adapter assembly comprising an adapter secured to the oscillating tool at one end portion, an axle attached thereto the other end portion of the adapter, and a wheel comprising a bearing concentrically aligned within the wheel. During use of the tool adapter system, a first oscillatory, or vibrational motion from the oscillating tool is transmitted to the wheel whereby a second oscillatory motion is present. The second oscillatory motion acts to agitate or vibrate an adhesive sheet into proper position when the tool adapter system is pressed against the sheet onto the target surface and/or moved laterally about the sheet by a user. The second oscillatory motion may also be used to install a rubber gasket surrounding a window during installation of the window.

It is a feature of the present invention that a first oscillatory motion generated by an oscillating tool is transmitted or converted to a second oscillatory motion at a wheel, the second oscillatory motion at the wheel being useful for applying polymers onto surfaces or for installing a rubber gasket to the surrounding edges of a window.

It is a feature of the present invention that the size, weight distribution, shape or form of the wheel may be varied to increase effectiveness of the tool adapter system for particular applications.

Embodiments include one, more, or any combination of all of the features listed above. Other features and advantages of the present invention will become apparent from the following more detailed description, taken in conjunction with the accompanying, which illustrate, by way of example, the principles of the invention.

DETAILED DESCRIPTION OF THE DISCLOSED EMBODIMENT

Figure 1:
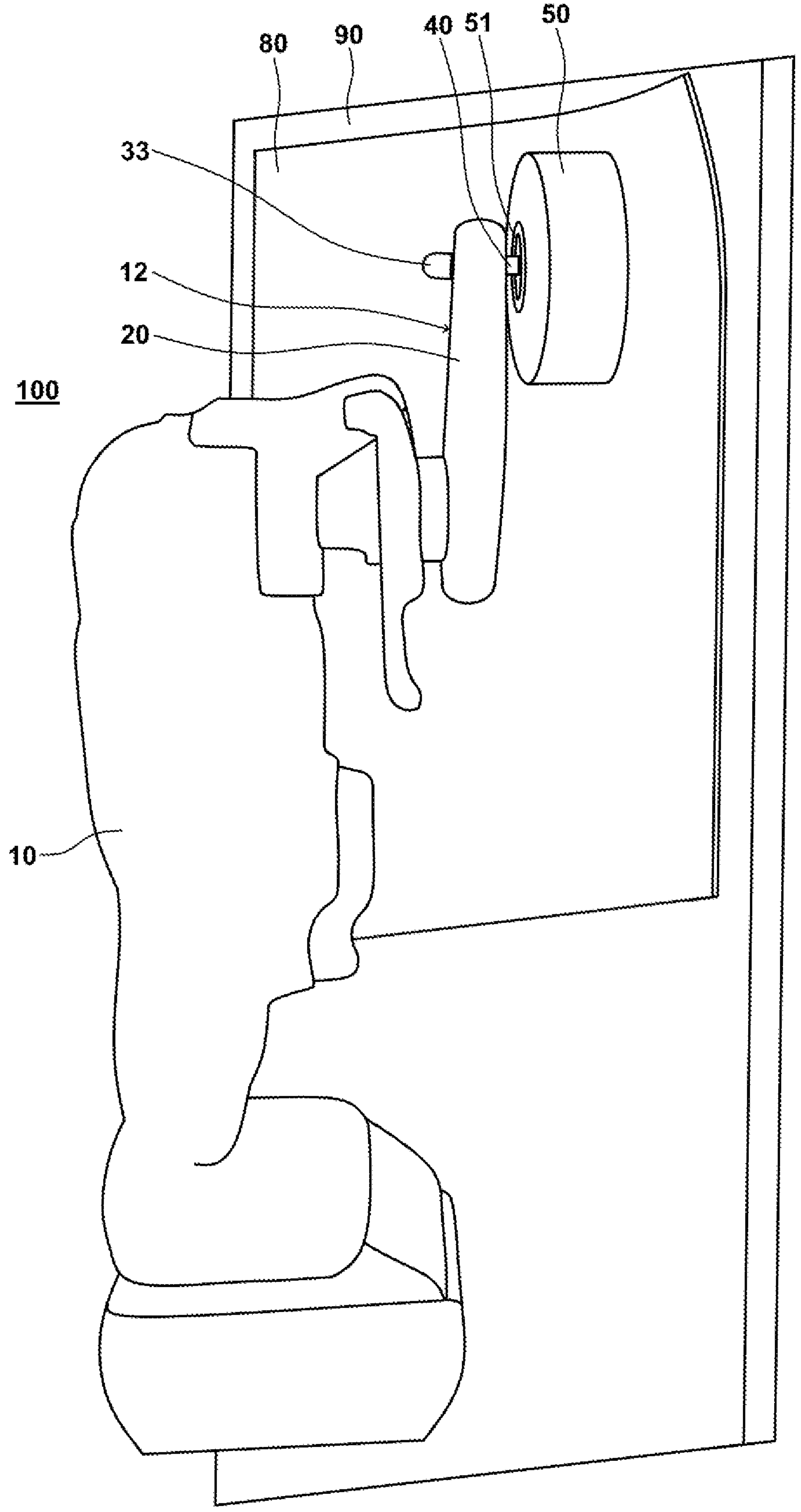
FIG. 1 is a side perspective view of tool adapter system in use to apply an adhesive sheet 80 to a target surface 90, in accordance with an exemplary embodiment of the present invention.

Illustrative embodiments of the invention are described below in the accompanying Figures. The following detailed description provides detailed schematics for a thorough understanding of and an enabling description for these embodiments. One having ordinary skill in the art will understand that the invention may be practiced without certain details. In other instances, well-known structures and functions have not been shown or described in detail to avoid unnecessarily obscuring the description of the embodiments. In the description, terms such as "upper" and "lower" should be construed to refer to orientation as then described or as shown in the drawings under discussion. The terms are for convenience of description and do not require that the system or component of the system be operated in a particular orientation.

FIG. 1 is a side perspective view of a tool adapter system 100 in use to apply an adhesive sheet 80 to a target surface 90, in accordance with an exemplary embodiment of the present invention. In a primary embodiment, the tool adapter system 100 comprises an oscillating tool 10 and an adapter assembly 12 comprising an adapter 20, an axle 40, a wheel 50, a bearing 51, and a nut 33. The oscillating tool 10 may be a multi-tool or any device designed to cause vibrational or oscillatory motion with a frequency range of 2,000 to 40,000 cycles per minute. The nut 33 may be a Nyloc nut or other type of nut designed to resist loosening due to vibrations. During operation of the tool adapter system 100, a first oscillating motion provided by the oscillating tool 10 is transmitted to the wheel 50, wherein a second oscillating motion having oscillating characteristics that are useful for applying rubber gaskets around windows during installation or for applying polymers onto surfaces is achieved. The second oscillating motion of the wheel 50 generally varies as a user applies a downward force at the wheel 50 against a surface. The adhesive sheet 80 may be a polymer such as vinyl and may further comprise an adhering surface designed to further adherence of the adhesive sheet 80 to a target surface 90. Target surface 90 may be a glassy material in use as a window, wall, dome, or other enclosure surface.

Figure 2A:
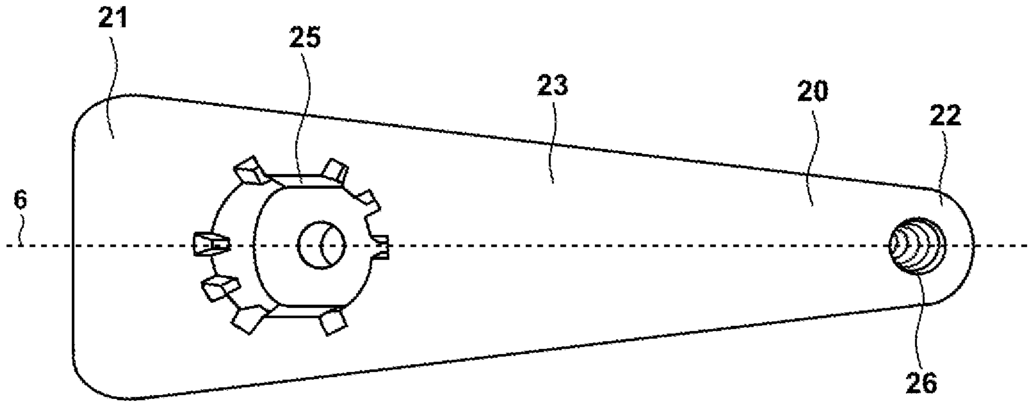
FIG. 2A is a top perspective view of an adapter, in accordance with an exemplary embodiment of the present invention.
Figure 2B:
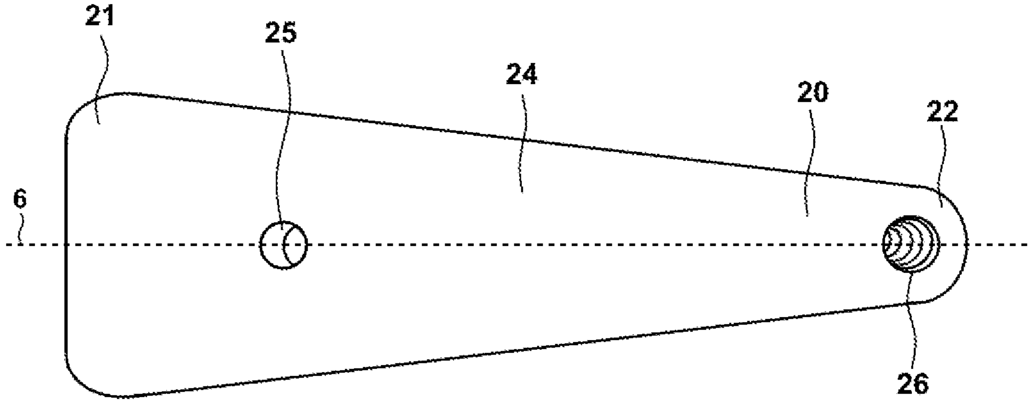
FIG. 2B is a bottom perspective view of the adapter shown in FIG. 2A, in accordance with an exemplary embodiment of the present invention.
Figure 2C:
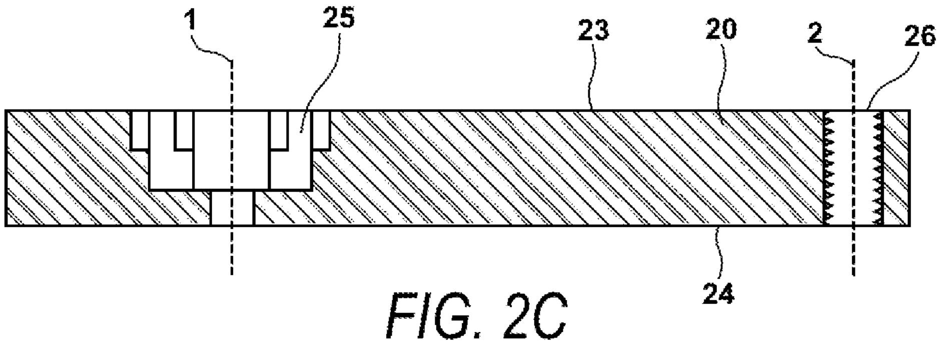
FIG. 2C is a side sectional view of the adapter shown in FIG. 2A taken along line 6, in accordance with an exemplary embodiment of the present invention.

FIG. 2A is a top perspective view of an adapter 20, in accordance with an exemplary embodiment of the present invention. FIG. 2B is a bottom perspective view of the adapter 20 shown in FIG. 2A, in accordance with an exemplary embodiment of the present invention. FIG. 2C is a side sectional view of the adapter 20 shown in FIG. 2A taken along line 6, in accordance with an exemplary embodiment of the present invention. The adapter 20 tapers from a proximal end portion 21 towards a distal end portion 22 in the anterior direction 3 with respect to an oscillating tool 10. The tapering of adapter 20 provides for adequate transmission of the first oscillatory motion to the wheel and for a lighter weighted assembly.

Defined within the volume of the upper portion 23 of the adapter 20 may be a key slot 25 centered about a first concentric axis 1. The key slot 25 is designed to match and securely attach to the locking mechanism 11 of the oscillating tool 10 so that the adapter 20 is resistant to loosening. Defined within the volume of the distal end portion 22 of the adapter 20 may be a threaded axle housing 26 centered about a second concentric axis 2 and designed to receive and secure the axle 40 therethrough. The upper end portion 41 of the axle 40 is generally designed to rotatably insert therethrough the threading of axle housing 26 about concentric axis 2 and is secured in place by the nut 33. The lower end portion 42 of the axle 40 may protrude radially outward to secure or bolt the wheel 50 to the adapter 20. The axle 40 may be manufactured from a substantially rigid polymer, metal, or other strong and durable material.

Figure 3A:
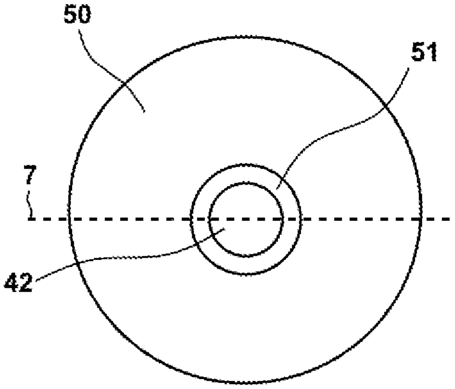
FIG. 3A is a bottom view of a wheel, bearing, and axle, in accordance with an exemplary embodiment of the present invention.
Figure 3B:
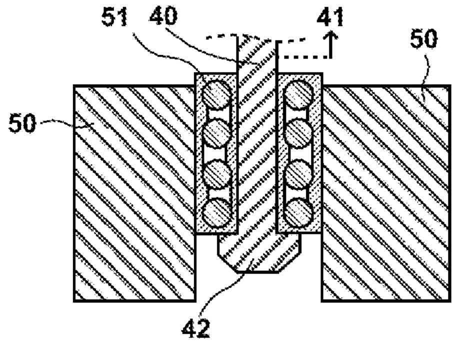
FIG. 3B is a sectional view of the wheel, bearing, and axle shown in FIG. 3A taken along line 7, in accordance with an exemplary embodiment of the present invention.

FIG. 3A is a bottom view of a wheel 50, bearing 51, and axle 40, in accordance with an exemplary embodiment of the present invention. FIG. 3B is a sectional view of the wheel 50, bearing 51, and axle 40 shown in FIG. 3A taken along line 7, in accordance with an exemplary embodiment of the present invention. The wheel 50 comprises a bearing 51 concentrically aligned within the wheel 50, wherein the bearing 51 provides the wheel 50 rotational freedom about the second concentric axis 2. The dimensions of the wheel 50 may be varied depending on the application.

Figure 4A:
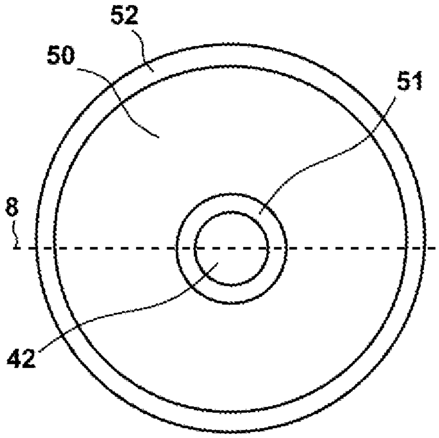
FIG. 4A is a bottom view of an alternate embodiment of a wheel, bearing, and axle, in accordance with an exemplary embodiment of the present invention.
Figure 4B:
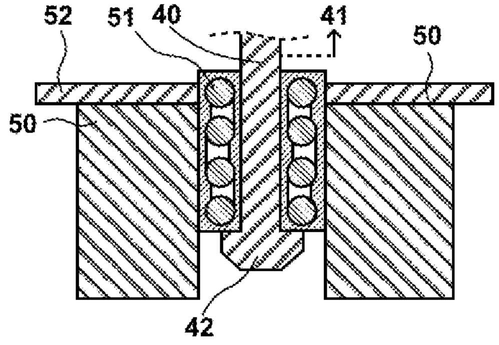
FIG. 4B is a sectional view of the wheel, bearing, and axle shown in FIG. 4A taken along line 8, in accordance with an exemplary embodiment of the present invention.

FIG. 4A is a bottom view of an alternate embodiment of a wheel 50, bearing 51, and axle 40, in accordance with an exemplary embodiment of the present invention. FIG. 4B is a sectional view of the wheel 50, bearing 51, and axle 40 shown in FIG. 4A taken along line 8, in accordance with an exemplary embodiment of the present invention. In this embodiment, a disk 42 is provided for guiding the wheel 40 along the 90 degree angled edge of the wheel 40 and a surrounding frame, the disk protruding radially beyond the wheel 42 and secured directly to the upper portion of the wheel 42. The inventor contemplates that the size, weight, and dimensions of the wheel 50 and bearing 51 may be varied depending on the size and weight of adhesive sheet 80 as well as tendency of the sheet 80 to adhere to target surface 90.

Furthermore, the dimensions of the adapter 20 and axle 40 may be varied depending on the application. In an example embodiment, a 4 ampere rated oscillating tool is anteriorly equipped with an adapter assembly 12 having an adapter 20 that is 10.2 cm (4 inches) long, 1.9 cm (¾ inch) thick, and tapers from 2.54 cm (1 inch) to 0.635 cm (¼ inch), an axle 40 that is 5.1 cm (2 inches) long with a 0.635 cm (¼ inch) diameter, a 0.635 cm (¼ inch) diameter nyloc nut 33, and a wheel 50 that is 5.1 cm (2 inches) in diameter and 2.54 cm (1 inch) thick. This example device is suitable for applying vinyl films to flat glass surfaces without damaging the film or the glass surface. This example embodiment may further provide a disk 42 that is up to 7.6 cm (3 inches) in diameter.

In an alternate example embodiment of the present invention, a 3 ampere rated oscillating tool is anteriorly equipped with an adapter assembly 12 having an adapter 20 that is 10.2 cm (4 inches) long, 1.9 cm (¾ inch) thick, and tapers from 7.6 cm (3 inches) to 2.54 cm (1 inch), an axle 40 that is 7.6 cm (3 inches) long with a 1.27 cm (½ inch) diameter, a 1.27 cm (½ inch) diameter nyloc nut 33, and a wheel 50 that is 3.8 cm (1½ inches) in diameter and 2.54 cm (1 inch) thick. This example device is also suitable for applying vinyl films to a window without damaging the film or the window.

In various embodiments, the wheel 50 may be manufactured of a soft polymeric material such as, but not limited to, polyurethanes. In some embodiments, the wheel 50 may taper towards the axle 40 proximate to the lower end portion 42 of the axle 40. In embodiments having a disk section 52, the disk section 52 may be manufactured of a soft polymeric material or a rigid and durable polymeric material.

While particular embodiments of the invention have been described and disclosed in the present application, it is clear that any number of permutations, modifications, or embodiments may be made without departing from the spirit and the scope of this invention. Accordingly, it is not the inventor's intention to limit this invention in this application, except as by the claims.

Particular terminology used when describing certain features or aspects of the invention should not be taken to imply that the terminology is being redefined herein to be restricted to any specific characteristics, features, or aspects of the invention with which that terminology is associated. In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

In light of the above "Detailed Description," Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

What is claimed is:

1. An adapter assembly for an oscillating tool, said adapter assembly comprising:

an adapter having an upper portion, a lower portion, a proximal end portion, and a distal end portion;

wherein said adapter has a top edge and a bottom edge, wherein the top edge and bottom edge congruently intersect at the distal end portion, and the top edge and bottom edge diverge therefrom; the proximal end portion comprising a width that spans between the top edge and bottom edge;

wherein defined within a volume of said distal end portion of said adapter is a threaded axle housing;

an axle having an upper end portion and a lower end portion;

a wheel comprising a bearing concentrically aligned within said wheel;

defined within a volume of said upper portion and said proximal end portion of said adapter is a key slot centered about a first concentric axis.

2. The adapter assembly of claim 1, further comprising a nut for securing said axle to said adapter, said nut fastening to said upper end portion of said axle.

3. The adapter assembly of claim 1, wherein said nut is a nyloc nut.

4. The adapter assembly of claim 1, wherein said key slot is designed to match and secure said adapter to said oscillating tool.

5. An adapter assembly for an oscillating tool, said adapter assembly comprising:

an adapter having an upper portion, a lower portion, a proximal end portion, and a distal end portion;

an axle having an upper end portion and a lower end portion;

a wheel comprising a bearing concentrically aligned within said wheel;

wherein defined within a volume of said distal end portion of said adapter is a threaded axle housing centered about a second concentric axis and designed to receive and secure said axle therethrough.

6. The adapter assembly of claim 5, wherein said upper end portion of said axle is rotatably insertable therethrough said axle housing about said second concentric axis.

7. The adapter assembly of claim 6, wherein said upper end portion is secured in place by a nut.

8. The adapter assembly of claim 1, wherein said lower end portion of said axle protrudes radially outward for securing or bolting said wheel to said adapter.

9. The adapter assembly of claim 1, wherein said wheel tapers towards said axle proximate to said lower end portion of said axle.

10. The adapter assembly of claim 1, further comprising a disk directly attached to said wheel and radially protruding beyond said wheel.

11. An adapter assembly for converting a first oscillating motion from an oscillating tool to a second oscillating motion, said second oscillating motion being useful for applying an adhesive sheet or film to a target surface, said adapter assembly comprising:

an equilateral-triangle-shaped adapter having an upper portion, a lower portion, a proximal end portion comprising a oscillating tool key lock configured to removably couple with an oscillating tool, and a distal end portion, wherein defined within a volume of said distal end portion is a threaded axle housing;

a wheel comprising a bearing concentrically aligned within said wheel; and an axle having an upper end portion and a lower end portion, said upper end portion being concentrically aligned with and insertable therethrough said axle housing of said adapter, said lower end portion securely fastened to said bearing.

* * * * *